No. 641,290. Patented Jan. 16, 1900.
J. S. HIGHFIELD.
PRESSURE REGULATING APPARATUS FOR MAINS.
(Application filed July 21, 1899.)

(No Model.) 2 Sheets—Sheet 1.

Witnesses
Inventor
John S. Highfield
by Bakewell & Bakewell
his attys

No. 641,290. Patented Jan. 16, 1900.
J. S. HIGHFIELD.
PRESSURE REGULATING APPARATUS FOR MAINS.
(Application filed July 21, 1899.)
(No Model.) 2 Sheets—Sheet 2.

UNITED STATES PATENT OFFICE.

JOHN SOMERVILLE HIGHFIELD, OF ST. HELENS, ENGLAND.

PRESSURE-REGULATING APPARATUS FOR MAINS.

SPECIFICATION forming part of Letters Patent No. 641,290, dated January 16, 1900.

Application filed July 21, 1899. Serial No. 724,655. (No model.)

*To all whom it may concern:*

Be it known that I, JOHN SOMERVILLE HIGHFIELD, a citizen of England, residing at Wolseley road, St. Helens, county of Lancaster, England, have invented certain new and useful Improvements in Pressure-Regulating Apparatus for Electric Mains Used Chiefly in Connection with Storage Batteries, (for which I have applied for a patent in Great Britain, dated January 10, 1899, No. 537,) of which the following is a specification.

My invention consists in the employment of an improved form of generator of electric energy by means of which I increase or decrease the pressure of a supply from a source giving variable pressure, so as to keep the circuits supplied from such source at constant electrical pressure, and, further, when the variable source is a storage battery I employ the generator or booster in such a way as to keep constant the circuits that the battery is supplying on discharge, and I also by means of the booster raise the pressure of a constant-voltage circuit so as to charge the battery, so that the arrangement of the generator, a battery, and a power-driven dynamo supplying an electrical circuit enables me to keep the dynamo at or near its full load at all times by giving to the battery what energy is not required on the circuit and by causing the battery to help the dynamo when more energy is required than the dynamo can give, and so long as the load or demand for energy in the circuit does not exceed the combined output of dynamo and battery the generator and arrangement of the circuits according to my invention serve to keep the pressure in such circuits constant.

Figure 1:
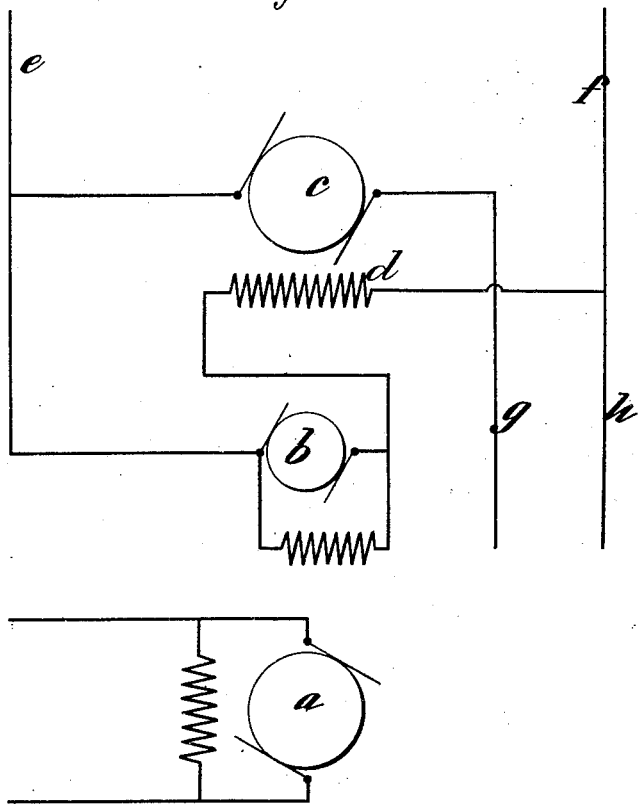
Figure 2:
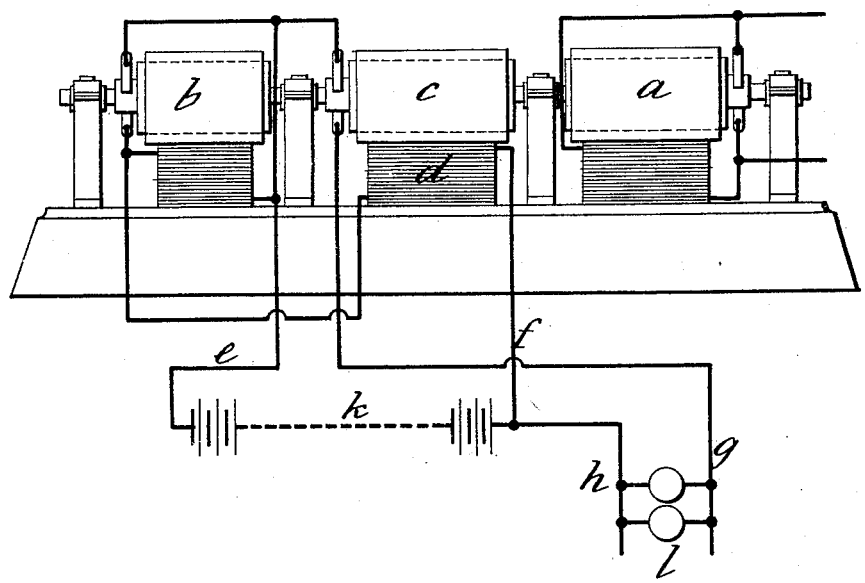

Figure 1 of the accompanying drawings is a diagram illustrating the arrangement of electrical apparatus and connections according to my invention. Fig. 2 is a diagram showing the three machines on one shaft and the electrical circuits.

$a$ is a motor, which may be electrical, as shown, having on its shaft the armature of an exciter $b$ and a generator or booster $c$, the field-coils $d$ of which are supplied from the exciter $b$.

$e$ and $f$ are the leads connecting to a source such as an accumulator-battery $k$, giving currents of variable pressure, and $g$ and $h$ are the leads connecting to the circuit or network of lamps $l$ or the like, which have to be supplied with currents of constant pressure.

The currents from the exciter $b$ being opposed to those from the source $e$ and $f$ and booster $e$ being so designed that the volts across its terminals vary as nearly as possible as the volts on its field-coils, which are equivalent to the difference of the pressure on the currents from the source by $e$ and $f$ and those from the exciter $b$, the polarity of the booster $c$ necessarily varies according as the pressure of the currents from the source is greater or less than that of the currents given by the exciter $b$, and the booster accordingly lessens or increases the pressure of the currents from the source, so that if the motor $a$, and consequently the exciter $b$ and booster $c$, be driven at nearly uniform speed the pressure of the currents in the leads $g\ h$ is nearly constant.

In some cases—as, for instance, when a storage battery $k$ is the source of energy—it receives energy from the circuit, and the booster then adds to the pressure of the circuit, as the pressure of the battery increases while the charge progresses. When the charge is suddenly stopped and discharge is commenced, then the booster opposes the pressure given by the battery while that pressure exceeds that required on the circuit, and thus as the pressure of the battery varies the booster corrects the variation. The exciter also at times acts as a generator and at times as a motor, according as its voltage is less or greater than that of the source; but at constant speed it gives approximately constant volts. These results may be understood from the following examples of the working of the system.

When the pressure at $g\ h$, due to supply from the battery $k$, is less than that required, the exciter $b$ sends a current, owing to the pressure given by the battery $k$ being lower than that of the exciter $b$. This current traverses the coil $d$ and so excites the field of the booster $c$ to such an extent that the armature $c$ develops an electrical pressure sufficient to make up the difference between the pressure of the battery $k$ and of the exciter $b$, and the coil $d$ is so connected that the pressure given by $c$ helps the pressure given by $k$. Thus the leads $g\ h$ receive at the desired pressure—namely, that given by the exciter $b$. As the battery $k$ discharges its pressure falls, and then the exciter $b$ sends a greater current through $d$, owing to the greater difference of pressure between the exciter $b$ and the battery $k$, and hence the booster $c$ develops a greater pressure and keeps up the pressure on $g\ h$.

When the pressure in $e\,f$ is raised by supplying electric energy from some external source to the mains $g\ h$, and thus relieving the battery $k$ of some of its work, the pressure on $e\ f$ gradually approaches that given by the exciter $b$, and hence the current sent through the field-coils $d$ is decreased and the pressure given by $c$ is correspondingly diminished, so that the pressure at $g\ h$ is still kept constant. Again, when a greater amount of energy is supplied to the leads $g\ h$ than that required by the consuming devices the surplus energy then tends to go through the booster $c$ in such a way as to charge the storage-cells $k$. The pressure given by $k$ thus gradually increases till it is equal to that given by the exciter $b$, so that there is no current through $b$.

The battery $k$ preferably consists of such a number of cells that when half-charged it can in open circuit give the pressure desired at the leads $g\ h$. Then a slight increase of pressure on the leads $g\ h$ causes a current to flow from them through the booster $c$ and the leads $e f$ in such a direction as to charge the battery $k$. The pressure on $k$ is thus gradually raised till it becomes greater than that given by the exciter $b$. A current thus flows through the field-coils $d$ from the battery-leads $e f$ through the exciter $b$, reversing the field magnetism of the booster $c$ and causing it to generate a pressure, which is added to the pressure in the leads $g\ h$, so as to charge the battery. When the pressure given by the battery $k$ is thus continually raised, the current through $d$ to the exciter $b$ also continually rises, and so the booster adds to the pressure in $g\ h$ from the external source sufficient pressure to the leads $e f$ to continue the charge.

The field-magnets of the booster and of the exciter may have a second winding through which the whole current given by either may pass so as to correct for fall of potential due to the ohmic resistance on the circuits supplied by each.

Having thus described the nature of this invention and the best means I know of carrying the same into practical effect, I claim—

A pressure-regulator for electric mains comprising a motor, an exciting-dynamo and a generating-dynamo or booster all having their armatures on one shaft, the exciter being arranged so that its currents oppose those from the source of energy and excite the field-magnet of the booster which has its armature-coils in the lead from the source to the circuit, substantially as described.

In testimony whereof I have hereunto set my hand in presence of two subscribing witnesses.

JOHN SOMERVILLE HIGHFIELD.

Witnesses:
 EDWARD B. DIRFFIELD,
 JOHN J. CALLIN.